United States Patent [19]

Masaki

[11] 4,194,238

[45] Mar. 18, 1980

[54] POWER SUPPLY APPARATUS

[75] Inventor: Takaaki Masaki, Tohru Morioka, both of Hyogo, Japan

[73] Assignee: Sanyo Electric Company, Ltd., Moriguchi, Japan

[21] Appl. No.: 882,413

[22] Filed: Mar. 1, 1978

[30] Foreign Application Priority Data

Mar. 4, 1977 [JP] Japan .................................. 52-25301
Aug. 25, 1977 [JP] Japan .......................... 52-114853[U]
Aug. 29, 1977 [JP] Japan .......................... 52-116295[U]
Sep. 7, 1977 [JP] Japan ................................ 52-108438
Nov. 18, 1977 [JP] Japan ................................ 52-139596
Nov. 18, 1977 [JP] Japan .......................... 52-156250[U]
Dec. 14, 1977 [JP] Japan ................................ 52-152151
Dec. 14, 1977 [JP] Japan ................................ 52-152152
Dec. 14, 1977 [JP] Japan .......................... 52-152153[U]

[51] Int. Cl.$^2$ ........................................ H02M 3/335
[52] U.S. Cl. .................................... 363/17; 363/132
[58] Field of Search ............................. 307/255, 288; 331/113 A; 363/15–17, 131, 132, 22, 133; 310/29

[56] References Cited

U.S. PATENT DOCUMENTS 3,289,105 11/1966 Funfstuck .......................... 363/22 X
3,327,244 6/1967 Fay et al. ........................... 363/22 X
3,480,848 11/1969 Church ............................. 310/29 X
3,521,942 7/1970 Temple ......................... 331/113 A X Primary Examiner—William M. Shoop
Attorney, Agent, or Firm—Darby & Darby

[57] ABSTRACT

A series connection of a pair of dividing capacitors and a series connection of a PNP transistor and an NPN transistor are connected in parallel with a direct current voltage source, a primary winding of a saturable transformer is coupled between the junctions of the respective series connections, the saturable transformer comprising a pair of feedback windings coupled to the primary winding, the pair of feedback windings are connected between the base and emitter electrodes of the respective corresponding transistors through the respective base resistors, the emitter electrodes of the respective transistors being connected to the direct current voltage source sides, a series connection of two capacitors is connected between the junctions of the respective feedback windings and base resistors, and the junction of the two capacitors is connected to the junction of the series connection of the dividing capacitors. A secondary winding is coupled to the primary winding of the saturable transformer and a direct current output voltage is obtained through rectification of the output from the secondary winding.

19 Claims, 30 Drawing Figures

POWER SUPPLY APPARATUS

BACKGROUND OF THE INVENTION

1. Field of the Invention

The present invention relates to a power supply apparatus. More specifically, the present invention relates to a direct current power supply apparatus employing a direct current/alternate current inverter, particularly suited for small sized and light weight electrical equipement.

2. Description of the Prior Art

A self-excited inverter employing a Royer oscillator has been proposed and put into practical use as an inverter for use in a power supply apparatus. Since such a Royer type inverter is well known, it is not believed necessary to describe the same in detail. Briefly described, a Royer type inverter comprises two power transistors which are each utilized as a switching device such that a direct current is on/off controlled or switched to provide an alternate current voltage of a rectangular wave form, wherein the switching operation of the transistors is achieved by a feedback coil coupled to the primary winding of a saturable transformer. In operation of such a Royer type inverter, one transistor is rendered conductive while the other transistor is rendered non-conductive for a given time period and then the operation state is reversed and thereafter such an operation is repeated. In such a Royer type inverter, the excited voltage in the primary winding of the saturable transformer serving as a common load of the respective transistors causes a voltage as high as approximately two times the power source voltage to be applied between the collector and emitter electrodes in the non-conduction state. Accordingly, transistors of a higher withstand voltage are required for such an inverter.

A so called half bridge type inverter has also been proposed as an improvement on the above described Royer type inverter. A typical example of a half bridge type inverter is shown in FIG. 1. For facility of understanding of the present invention, the structure and operation of the half bridge inverter 1 shown in FIG. 1 will be described to the extent as desired or necessary. When a switch 3 is turned on, a direct current voltage from a direct current voltage source 2 causes a current to flow through base resistors 7 and 11 of a pair of PNP transistors 6 and 10 and a voltage drop across the respective base resistors 7 and 11 is about to render the pair of PNP transistors 6 and 10 conductive. It is seen that a starting resistor 13 is connected between the base and collector electrodes of the transistor 10. For this reason, the current flowing through the base resistor 11 is larger than the current flowing through the other base resistor 7 and hence the transistor 10 is rendered conductive earlier than the transistor 6. When the transistor 10 is rendered conductive, the electric charge in a dividing capacitor 9 is discharged through the transistor 10 and a primary winding 5 wound on a saturable magnetic core 14. On the other hand, a dividing capacitor 4 starts being charged by a current flowing through the transistor 10 and the primary winding 5 from the direct current voltage source 2. At that time, the current flowing from the point a to the point b of the primary winding 5 induces a voltage across one feedback winding 12 in the direction for forward biasing the transistor 10 and also induces a reverse bias voltage for the transistor 6 in the other feedback winding 8. Accordingly, the transistor 10 is rendered conductive, while the transistor 10 is rendered non-conductive, with the result that a positive half wave output is generated in a secondary winding 15 wound on the magnetic core 14 and coupled to the primary winding 5.

Thus, the primary winding 5 is excited. When the primary winding 5 is thus excited and the magnetic core 14 of the saturable transformer is saturated, the magnetomotive force of the magnetic core 14 disappears and a voltage is induced in the respective feedback windings 8 and 12 in the reverse direction. Therefore, one transistor 10 is rendered non-conductive and the other transistor 6 is rendered conductive. Accordingly, the electric charge in the dividing capacitor 4 is discharged through the primary winding 5 and the transistor 6 and the dividing capacitor 9 is charged by a current flowing through the primary winding 5 and the transistor 6 from the direct current voltage source 2. The above described charging current causes the primary winding 5 to be excited in the direction from the point b to the point a, with the result that a negative half wave output is obtained in the secondary winding 15.

The output from the inverter 1 is obtained through the secondary winding 15 wound on the saturable magnetic core 14 and coupled to the primary winding 5 and is applied to a load circuit 200, which may comprise a direct current motor, for example.

Since in such a half bridge type inverter as shown in FIG. 1, the voltage E of the direct current voltage source 2 is divided by two by means of a pair of dividing capacitors 4 and 9, the voltage E is applied between the collector and emitter electrodes of the transistor in conduction. As a result, according to a half bridge type inverter, transistors of a lower withstand voltage can be employed as compared with a case of a Royer type inverter.

However, even a half bridge type inverter still has several problems to be solved. More specifically, one transistor 10 need be provided with a starting resistor 13 for preferentially rendering the other transistor 10 conductive. Because of the starting resistor 13, the bias circuits for two transistors 6 and 10 selected as a pair in terms of the electrical characteristics become asymmetrical. However, this causes a situation that the transistor 10 is not rendered fully non-conductive or cut off, i.e. a somewhat conductive tendency is left even in the non-conduction period. In order to avoid such a situation, it could be considered that a reverse bias is applied between the base and emitter electrodes of the transistor 10, although there remains some difficulty. Another problem is that the above described conductive tendency of the transistor 10 makes the output wave of the inverter 1 asymmetrical with respect to the positive and negative polarities, with the result of poor efficiency. This fact is also liable to cause a short circuited state of the pair of transistors 6 and 10.

SUMMARY OF THE INVENTION

According to the present invention, a power supply apparatus comprising an improved direct current/alternate current inverter is provided, wherein a series connection of a pair of dividing capacitors and a series connection of a pair of complementary transistors are coupled in parallel with a direct current voltage source, a primary winding wound on a saturable magnetic core is connected between the junction of the pair of dividing capacitors and the junction between the pair of complementary transistors, a pair of feedback windings are wound on the saturable magnetic core so as to be magnetically coupled to the primary winding, the pair of feedback windings are connected between the base and emitter electrodes of the respective transistors through the respective base resistors, and an impedance means is interposed between the junctions of the respective feedback coils and base resistors for the respective transistors.

Accordingly, a principal object of the present invention is to provide a power supply apparatus employing an inverter, wherein a pair of complementary transistors are utilized with asymmetrical biasing circuit.

Another object of the present invention is to provide a power supply apparatus of a stabilized operation with respect to a load fluctuation.

A further object of the present invention is to provide a power supply apparatus employing an inverter of an improved conversion efficiency.

Still a further object of the present invention is to provide a power supply apparatus employing an inverter employing transistors of a decreased power loss.

Still another object of the present invention is to provide a power supply apparatus of compactness and an increased current capacity.

Still a further object of the present invention is to provide a power supply apparatus most suited for a power source for small sized and portable electrical equipement.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
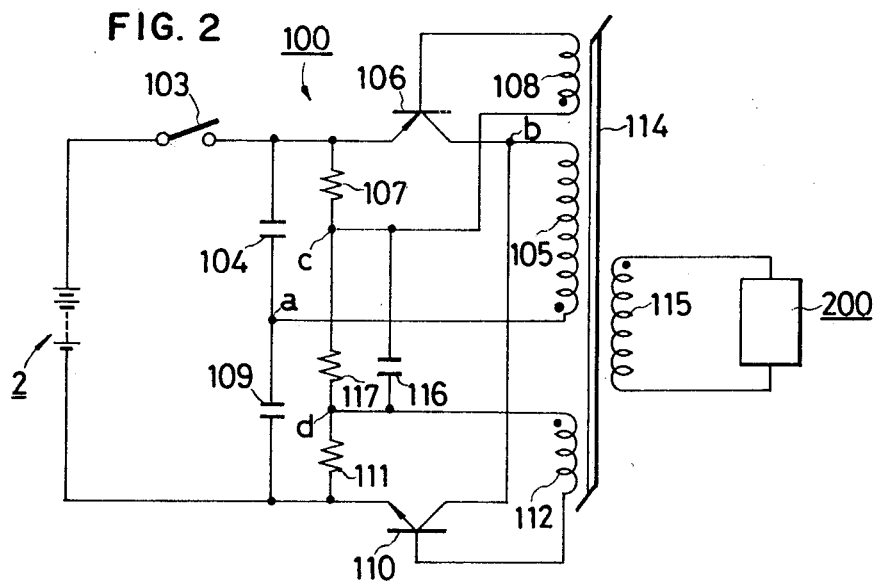
FIG. 2 is a schematic diagram of one embodiment of an inverter for practicing the present invention.

Referring to FIG. 2, a fundamental circuit configuration of a direct current/alternate current inverter for use in the present invention is shown. The embodiment shown comprises a series connection of a pair of dividing capacitors 104 and 109 and a series connection of a PNP transistor 106 and an NPN transistor 110, both series connections being coupled in parallel with a direct current voltage source 2 through a switch 103. A primary winding 105 wound on a saturable magnetic core 114 for constituting a saturable transformer is interposed between the junctions a and b of the respective series connections. The saturable transformer further comprises a secondary winding 115 and a pair of feedback windings 108 and 112 wound on the saturable magnetic core 114 so as to be magnetically coupled to the primary winding 105. The secondary winding 115 is connected to a load circuit 200.

One end of each of the feedback windings 108 and 112 is connected to each of the base electrodes of the respective transistors 106 and 110. The other end of each of the respective feedback windings 108 and 112 is connected to each of the emitter electrodes of the respective transistors 106 and 110 through each of the respective base resistors 107 and 111 so as to constitute a respective base biasing circuit. A capacitor 116 is interposed between the junction c of the feedback winding 108 and the base resistor 107 and the junction d between the feedback winding 112 and the base resistor 111 and the capacitor 116 is shunted by a resistor 117 of a large resistance value.

If and when the switch 103 is closed, a current flows through the pair of base resistors 107 and 111 and the capacitor 116 and a voltage drop across the respective base resistors 107 and 111 is about to render the respective transistors 106 and 110 conductive. However, because of a different characteristic of those components such as the transistors 106 and 110, the feedback windings 108 and 112 and the base resistors 107 and 111, only either transistor is likely to be conductive earlier than the remaining. Assuming that the transistor 106 is likely to be conductive earlier than the other transistor 110 in the embodiment shown. If and when the PNP transistor 106 becomes conductive, the electric charge charged in the dividing capacitor 104 is discharged through the transistor 106 and the primary winding 105. On the other hand, the dividing capacitor 109 starts being charged by a current flowing through the transistor 106 and the primary winding 105 from the direct current voltage source 2. At that time, the current flowing from the node b of the primary winding 105 to the node a induces a voltage in one feedback winding 108 in the direction for forward biasing the transistor 106 and a voltage in the other feedback winding 112 for reverse biasing the transistor 110. Accordingly, the transistor 106 is rendered conductive and the transistor 110 is rendered non-conductive, with the result that a positive half wave output is obtained in the secondary winding 115.

The primary winding 105 is thus excited and the magnetic core 114 of the saturable transformer comes to be saturated. When the magnetic core 114 is saturated, the magnetomotive force of the magnetic core 114 disappears and a reverse directional voltage is induced in the respective feedback windings 108 and 112. Therefore, one transistor 106 is rendered non-conductive and the other transistor 110 is rendered conductive. Accordingly, the electric charge in the dividing capacitor 109 is discharged through the primary winding 105 and the transistor 110 and the dividing capacitor 104 is charged by a current flowing through the primary winding 105 and the transistor 110 from the direct current voltage source 2. The above described charging current causes the primary winding 105 to be excited in the direction from the node a to the node b, with the result that a negative half wave output is obtained in the secondary winding 115.

Thereafter, the conduction state of the transistors is reversed each time the magnetic core 114 of the saturable transformer is saturated as described above and a positive half wave output and a negative half wave output are obtained alternately, in the secondary winding 115.

Figure 1:
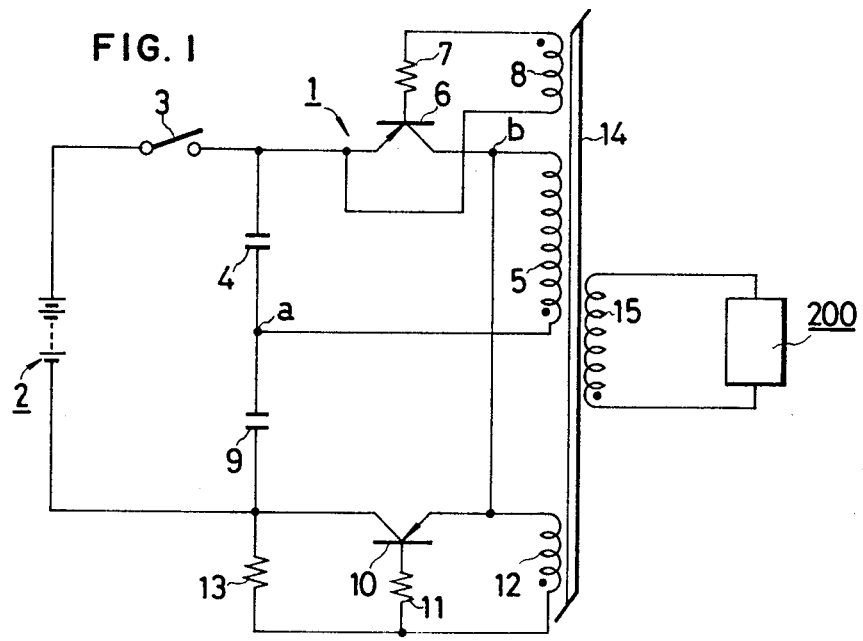
FIG. 1 is a schematic diagram of a conventional half bridge type inverter.

One feature to be noted in the FIG. 2 embodiment is a connection of the capacitor 116 and the resistor 117. The said connection of the capacitor 116 and the resistor 117 causes an ample current to flow through the base biasing circuit at the initial stage of the operation and this eliminates the necessity of a starting resistor required in the prior art, as denoted by the reference numeral 13 in FIG. 1. In addition, the pair of transistors 106 and 111 are implemented by complementary transistors and the emitter electrodes of the respective transistors are coupled to the direct current voltage source side. As a result, the base biasing circuits of the respective transistors 106 and 110 can be provided on the voltage source side with respect to the primary winding 105 of the transformer, which makes it possible to implement the above described pair of base biasing circuits symmetrical. Accordingly, the output from the inventive inverter can be made symmetrical. The above described symmetrical circuit configuration of the base biasing circuits facilitates selection of the impedance values of various impedance components such as resistors and capacitors for constituting the base biasing circuits. In addition, according to the embodiment shown, a conductive tendency of only one transistor as discussed in conjunction with the prior art can be avoided and thus a short circuited state of the pair of transistors 106 and 110 is avoided.

Figure 3:
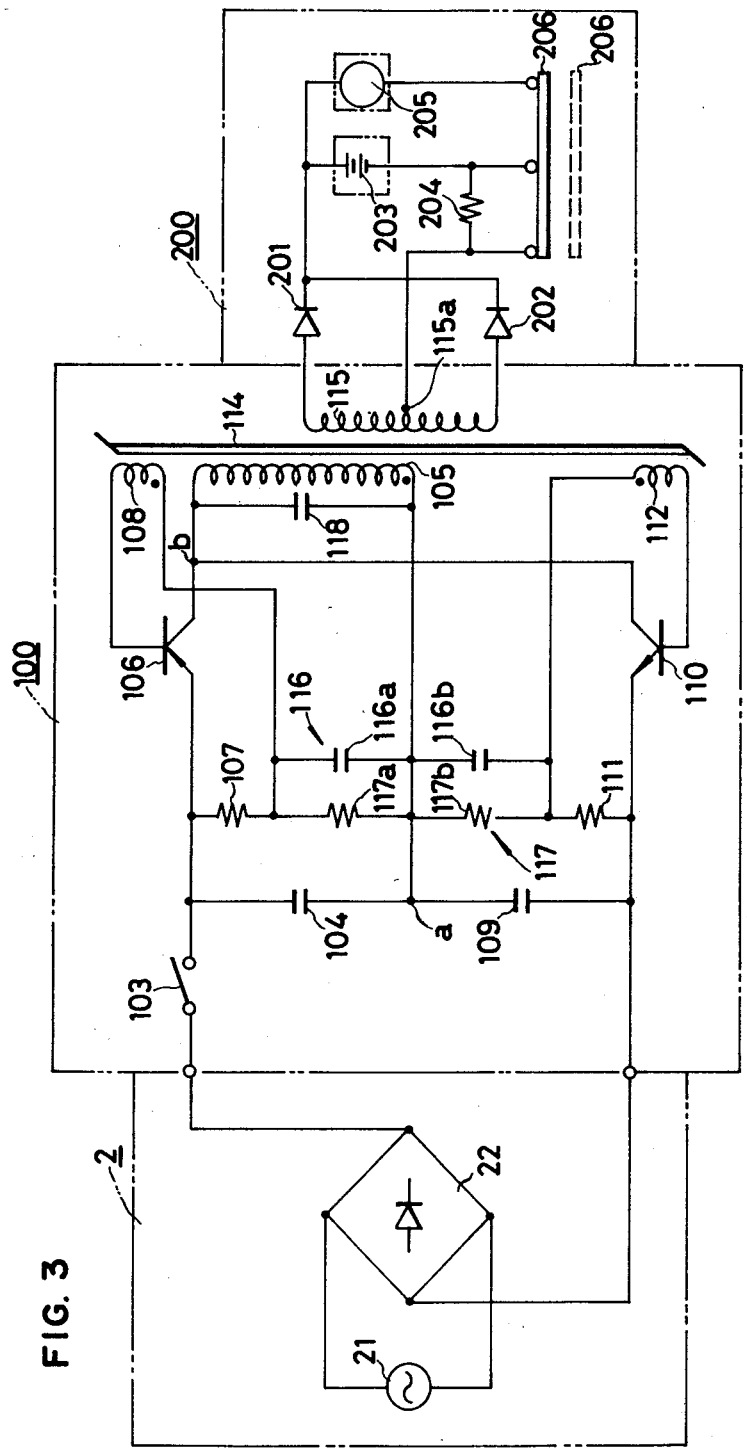
FIG. 3 is a schematic diagram of a preferred embodiment of the present invention.

Referring to FIG. 3, a preferred embodiment of a power supply apparatus employing the above described inverter will be described. It is pointed out that the embodiment shown is most suited as a power supply for energizing electrical equipement employing a small sized direct current motor such as a motor driven electric shaver, a motor driven tooth brush and the like. Thus, the embodiment is shown comprising a storage battery 203 and a direct current motor 205 in the load circuit 200. Both terminals of the secondary winding 115 of the saturable transformer are coupled to rectifying diodes 201 and 202 constituting a rectifying circuit and the output of the rectifying circuit is connected to one end of the storage battery 203. The other end of the storage battery 203 is connected to a center tap 115a of the secondary winding 115 through a limiting resistor 204. In addition, both terminals of the storage battery 203 is connected to the direct current motor 205 through a switch contact 206. Accordingly, if and when the switch contact 206 is closed, the limiting resistor 204 is short circuited and accordingly the storage battery 203 is charged with a full wave rectified output obtained by rectifying an alternate current output in a rectangular wave form at the secondary winding 115 of the inverter 100 by means of the diodes 201 and 202. It is pointed out that the direct current motor 205 is also energized with the above described full wave rectified output.

The direct current voltage source 2 of the inverter 100 may comprise an alternate current voltage source 21 such as a commercial power supply and a bridge circuit 22 for full wave rectifying the alternate current output from the alternate current voltage source 21. Both terminals of the bridge circuit 22 are connected to the input terminals of the inverter 100 as the output terminals of the direct current voltage source 2.

The inverter 100 shown in FIG. 3 is different from the FIG. 2 inverter in the following respects. More specifically, in the FIG. 3 embodiment, the capacitor 116 and the resistor 117 are each implemented by series connections of two capacitors 116a and 116b and two resistors 117a and 117b, such that the junctions of the respective series connections are each connected to the junction a of the dividing capacitors 104 and 109. It has been observed that the connection of the respective capacitors 116a and 116b to the point a reduces a spike voltage occurring across the primary winding 105. More specifically, a spike voltage occurring across the primary winding 105 causes a current flowing through the capacitors 116a and 116b and the feedback windings 108 and 112 to the base and collector junctions of the respective transistors 106 and 110. The above described spike voltage causes a current to flow through the capacitors 104 and 109 to the emitter and collector junctions of the respective transistors 106 and 110 in the reverse direction. Accordingly, the above descrived spike voltage is absorbed in the inverter.

Figure 4A:
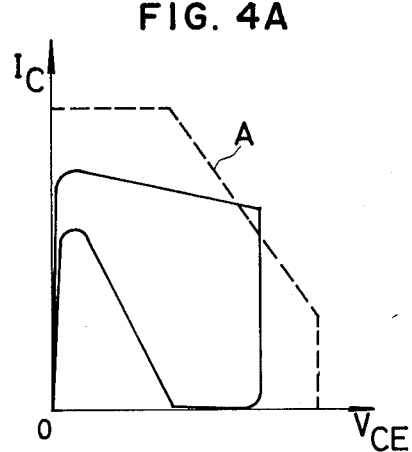
FIGS. 4A and 4B are load characteristic curves of the transistors employed in the FIG. 3 embodiment.
Figure 4B:
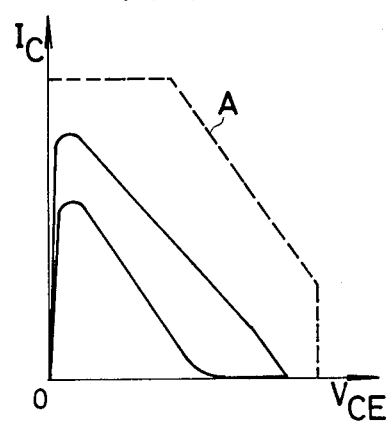

It is seen that in the FIG. 3 embodiment a capacitor 118 is connected across the primary winding 105. The said capacitor 118 also serves to absorb the spike voltage occurring in the primary winding 105. More specifically, without such capacitor 118, it could happen that the respective transistors 106 and 110 come to be outside the safe operation region A shown by the dotted line in FIG. 4A of the load characteristic curve. However, it has been observed that a connection of the capacitor 118 as described above serves to confine the operation of the transistors 106 and 110 within the safe operation region A as shown in FIG. 4B. In FIGS. 4A and 4B, the abscissa indicates the collector/emitter voltage ($V_{CE}$) of the transistors, while the ordinate indicates the collector current $I_C$ of the transistors. Since the operation of the inverter 100 in FIG. 3 is the same as that of the fundamental circuit configuration shown in FIG. 2, it is not believed necessary to described the same again.

Figure 6A:
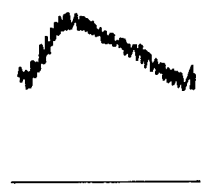
FIGS. 6A and 6B are wave forms of the output from the inverter shown in FIG. 5.
Figure 6B:
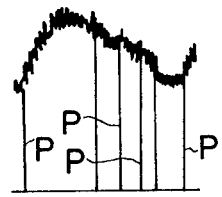
Figure 5:
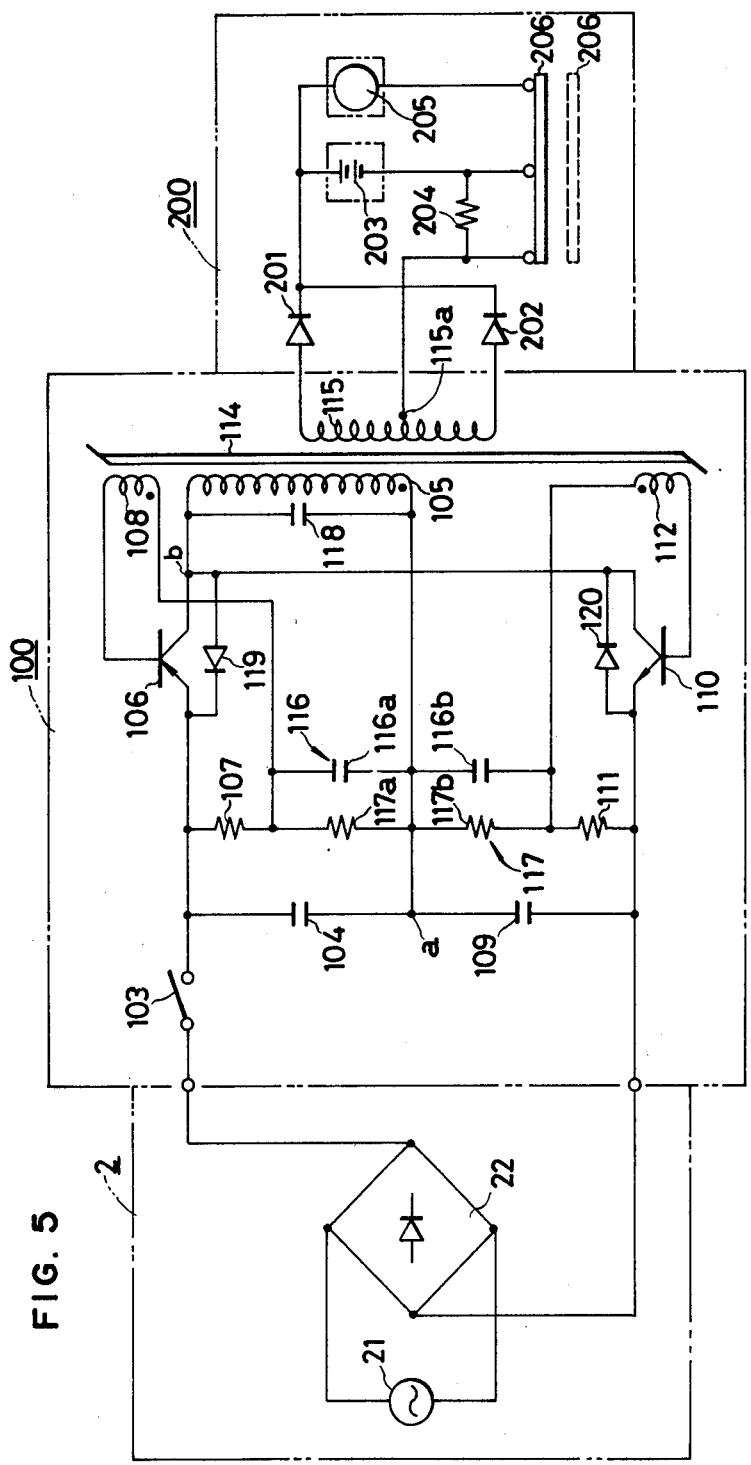
FIG. 5 is a schematic diagram of another preferred embodiment of the present invention.
Figure 7A:
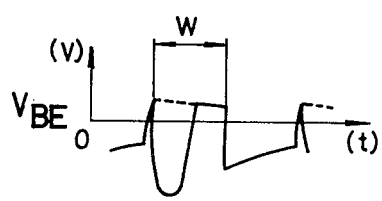
FIGS. 7A through 7J show wave forms of the electrical signals at various portions in the FIG. 5 embodiment.
Figure 7C:
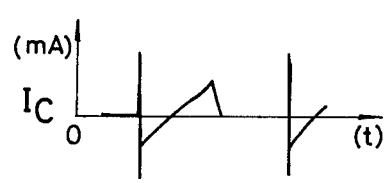
Figure 7B:
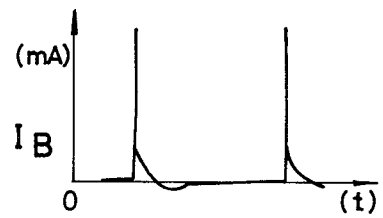
Figure 7D:

FIG. 5 shows a schematic diagram of another preferred embodiment of the present invention, wherein an improvement in the inverter is adopted. In comparison with the FIG. 3 embodiment, the FIG. 5 embodiment comprises diodes 119 and 120 coupled between the collector and emitter electrodes of the respective transistors 106 and 110 in the reverse direction. Since the remaining portions in the FIG. 5 embodiment are substantially the same as those in the FIG. 3 embodiment, only the characteristic features of the FIG. 5 embodiment will be described in detail in the following. Without such diodes 119 and 120, the secondary winding 115 provides a positive half wave output of a pulsive form as seen in FIG. 6B, although the normal wave form should be as shown in FIG. 6A. Such pulsive portions P cause an overvoltage to be applied between the base and emitter electrodes of the respective transistors 106 and 110 in the reverse direction, whereby the transistors 106 and 110 causes heat and the wave form of the output from the inverter 100 is distorted while a low frequency vibratory noise is caused from the saturable transformer. Actual measurement shows that the wave form of the base/emitter voltage $V_{BE}$ of the transistor 110, for example, is as shown in FIG. 7A. Similarly, the wave forms of the base current $I_B$, the collector current $I_C$ and the emitter current $I_E$ of the transistor 110 are shown in FIGS. 7B, 7C and 7D, respectively. Thus, a conduction period of the transistor 110 is shown as W in FIG. 7A. Referring to FIG. 7A, it is supposed that the base/emitter voltage $V_{BE}$ should be positive responsive to the rise of the base current $I_B$ and remains positive as shown by the dotted line. However, in actuality, a negative going valley portion appears as shown in the solid line in FIG. 7A. It is presumed that the above described negative going valley portion causes the above described pulsive portions P.

Figure 7E:
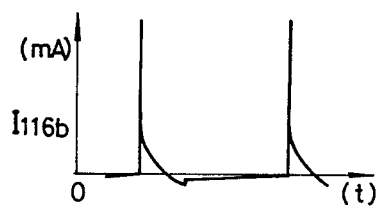
Figure 7H:
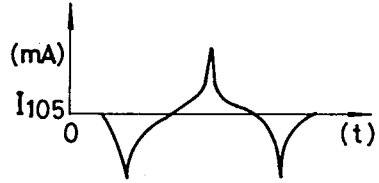
Figure 7F:
Figure 7I:
Figure 7G:
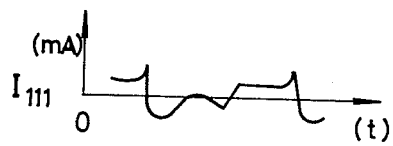

When the transistor 110 is shifted from the non-conduction state to the conduction state, a current is about to flow through the primary winding 105 in the direction from the point a to the point b. However, before that a current has been flowing through the primary winding 105 in the direction from the point b to the point a by virtue of the conduction of the transistor 106. As a result, a counter electromotive force is generated across the primary winding 105. The said counter electromotive force causes a current $I_{105}$ to flow through the primary winding 105 in the negative direction, i.e. in the direction from the point b to the point a, as shown in FIG. 7H, irrespective of the conduction of the transistor 110. The wave forms of the current $I_{116b}$ of the capacitor 116b, the curent $I_{117b}$ of the resistor 117b and the current $I_{111}$ of the base resistor 111 are shown in FIGS. 7E, 7F, and 7G, respectively. Taking into consideration the above described wave forms, it is presumed that the above described negative going current in the primary winding 105 flows from the base electrode to the collector electrode of the transistor 110 through the capacitor 116b and the resistor 117b of the parallel circuit and the feedback winding 112, whereby the transistor 110 is reverse biased and the above described negative going current flows through the dividing capacitor 109 and through the emitter/collector junction of the transistor 110. In other words, it is presumed that the above described negative going current causes a current to instantaneously flow through the transistor 110 in the reverse direction, whereby the transistor 110 instantaneously serves as a so called backward transistor, with the result that a negative going valley portion as shown in FIG. 7A is caused in the base/emitter voltage $V_{BE}$. Thus, it is presumed that such pulsive portions P are generated to cut off the transistor 110 which is about to be conductive by the counter electromotive force.

Figure 7J:
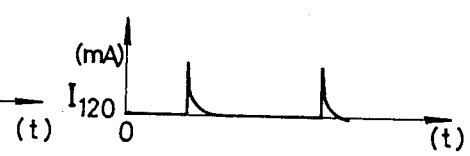

In the embodiment shown, the counter electromotive force occurring in the primary winding 105 is bypassed from the transistor 110 by means of the diode 120, whereby a current is prevented from flowing through the emitter/collector junction. As a result, the output of the wave form as shown in FIG. 6A is obtained from the secondary winding 115, wherein no pulsive portions P as seen in FIG. 6B have disappeared. Therefore, according to the embodiment shown, the wave form of the output from the inverter 100 is not distorted and a low frequency vibratory noise from the transformer is eliminated. The wave form of the base/emitter voltage $V_{BE}$ of the transistor 110 in such a situation is shown in FIG. 7I and the wave form of the current $I_{120}$ of the diode 120 is shown in FIG. 7J. Although in the foregoing only one transistor 110 and diode 120 were described, the same applies to the transistor 106 and the diode 119.

As seen from the foregoing description, according to the FIG. 5 embodiment, the wave distortion of the output from the inverter 100 and the vibratory noise of the transformer because of a spike voltage caused by a current flowing through the transistors 106 and 110 in the reverse direction due to the counter electromotive force in the primary winding 105 in the saturable transformer are eliminated by the diodes 119 and 120 connected in the reverse direction between the emitter and collector electrodes of these transistors.

As further seen from the foregoing description, if the transistors 106 and 110 are selected to be of a good reverse characteristic, then the diodes 119 and 120 can be dispensed with, while the above described effects are achieved. More specifically, since the diodes 119 and 120 are connected to bypass a reverse directional current between the collector and emitter electrodes of the transistors 106 and 110, such diodes 119 and 120 can be dispensed with, if and when the transistors 106 and 110 each have a good characteristic as a backward transistor.

Figure 8:
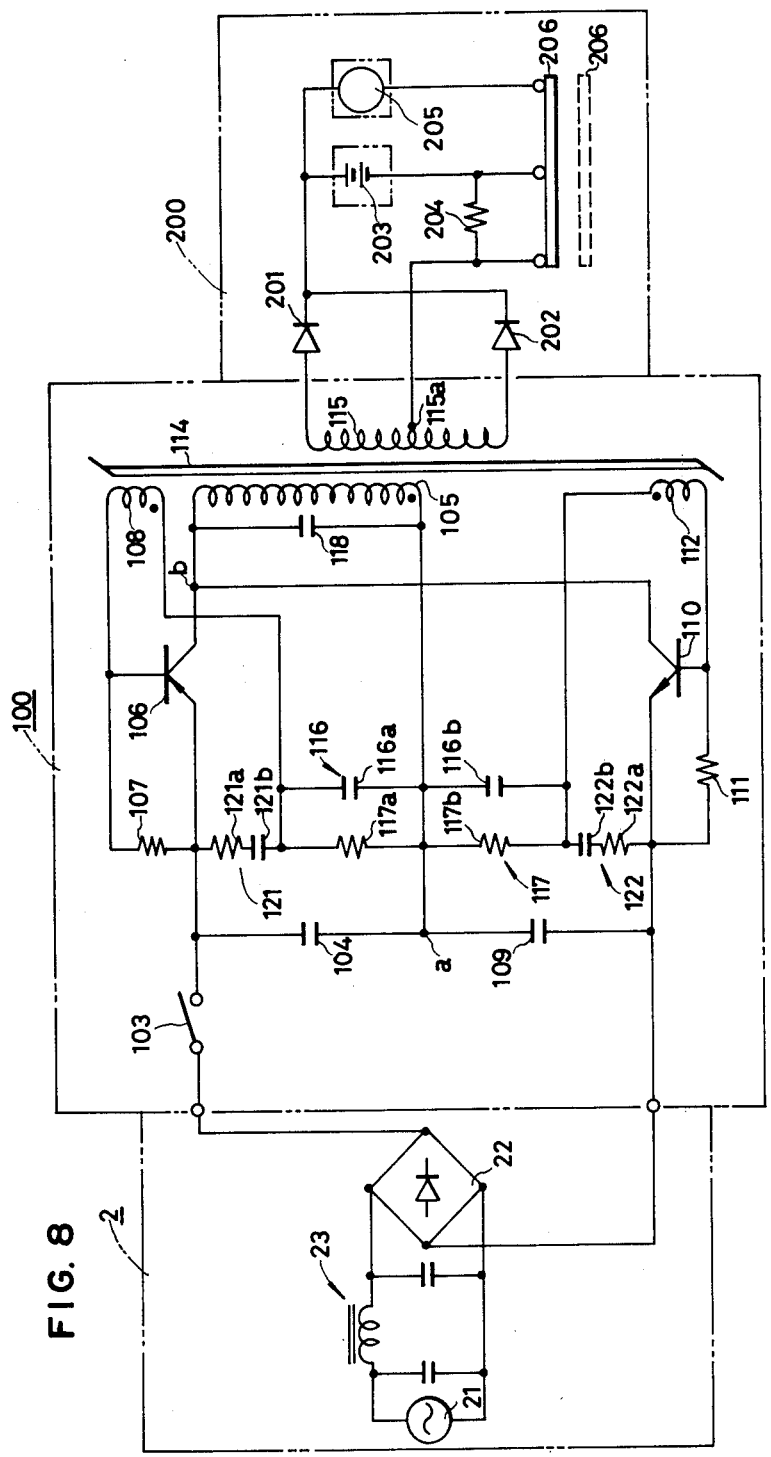
FIG. 8 is a schematic diagram of a further preferred embodiment of the present invention.

FIG. 8 shows a schematic diagram of a further preferred embodiment of the present invention, wherein it is contemplated that diversified current amplification factors of the transistors 106 and 110 are absorbed by connecting a pair of RC time constant circuits 121 and 122 to the base biasing circuits of the pair of transistors 106 and 110. Another modification in the FIG. 8 embodiment, as compared with the above described embodiments, is that a noise filter circuit 23 including a choke coil and a capacitor is interposed between the alternate current voltage source 21 such a commercial voltage source and the bridge circuit 22 and the above described time constant circuits 121 and 122 are interposed in the base biasing circuits of the inverter 100.

Figure 9:
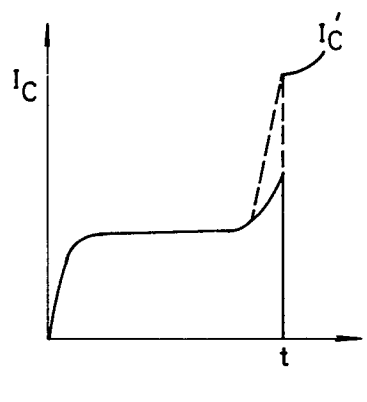
FIGS. 9 and 10 are wave forms of the collector current in the FIG. 8 embodiment.

In operation, when the switch 103 is turned on, a current flows through the pair of time constant circuits 121 and 122 and the capacitors 116a and 116b and the voltage drops in the respective time constant circuits 121 and 122 are about to cause the respective transistors 106 and 110 to be turned on. In such a situation, because of diversified characteristics of the circuit components such as the transistors 106 and 110, the feedback windings 108 and 112 and the time constant circuits 121 and 122, either transistor is about to become first conductive. Assuming that the transistor 106 is about to become first conductive in the embodiment shown, then substantially the same operation as described in conjunction with the FIG. 2 embodiment is effected thereafter. If and when the other transistor 110 becomes conductive in such a situation, then the collector current $I_C$ flows as shown in FIG. 9 and the saturable magnetic core 114 of the transformer becomes magnetically saturated immediately before the collector current $I_C$ disappears, with the result that a peak current $I_C'$ as shown by the dotted line in FIG. 9 flows. The voltage $V_{109}$ of the dividing capacitor 109 abruptly decreases at such peak point to become the voltage $V_{109}'$. Assuming that the capacitor 116b is not connected, the fluctuation $\Delta V$ of the base voltage of the transistor 110 in such voltage transition can be expressed by the following equation:

$$\Delta V = \frac{R_{122a}}{R_{122a} + R_{117b}} (V_{109} - V_{109}')$$

where $R_{122a}$ and $R_{117b}$ are the resistance values of the resistors 122a and 117b.

Since the above described fluctuation $\Delta V$ is small, the base current of the transistor 110 does not abruptly decrease and the collector current gives rise to a peak current $I_C'$ as shown by the dotted line in FIG. 9. By contrast, with the capacitor 116b, since the capacitor 116b is charged to the voltage $V_{116b}$, the fluctuation $\Delta V'$ of the base voltage of the transistor 110 when the dividing capacitor 109 is discharged through the primary winding 105 may be expressed by the following equation:

$$\Delta V' = (V_{109} - V_{116b}) - (V_{109}' - V_{116b}) = V_{109} - V_{10\text{-}9'}$$

The above described fluctuation $\Delta V'$ is larger than the fluctuation $\Delta V$ described previously and can decrease the base current of the transistor 110, with the result that the collector current $I_C$ exhibits a characteristic as shown in the solid line in FIG. 9, wherein no peak characteristic is seen. The same applies to the collector current of the other transistor 106 and the current load and heat in the respective transistors 106 and 110 can be mitigated.

Figure 10:
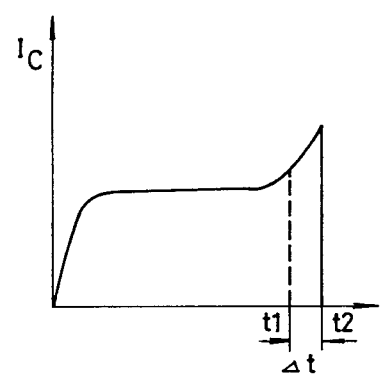
Figure 11:
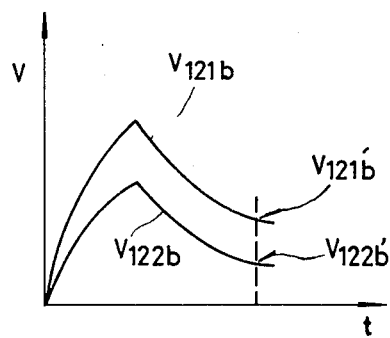
FIG. 11 is a wave form of the voltage across the time constant capacitor in the FIG. 8 embodiment.

According to the embodiment shown, the collector current $I_C$ of each of the respective transistors 106 and 110 exhibits a characteristic without a peak as shown in FIG. 9. However, the cut off time point t is different depending on the value of the current amplification factor of the respective transistors 106 and 110. More specifically, the cut off time point t2 of the transistor of a small current amplification factor comes earlier than the cut off time point t1 of a transistor of a large current amplification factor, as shown in FIG. 10, with the result of a difference $\Delta t$ in the conduction period of the transistors of different current amplification factors. This entails asymmetry in the positive and negative going directions in the inverter output. For example, referring to FIG. 8, assuming that one transistor 106 of the pair of transistors 106 and 110 is of a smaller current amplification factor as compared with that of the other transistor 110, then the base switching voltage or the base threshould value of the transistor 106 is larger than that of the other transistor 110. Therefore, the voltage $V_{104}$ of the dividing capacitor 104 corresponding to one transistor 106 is higher than the voltage $V_{109}$ of the other dividing capacitor 109. Therefore, the supply voltages $V_{104}$ and $_{109}$ differ from each other even when the time constants of the time constant circuits 121 and 122 provided in the base biasing circuits of the respective transistors 106 and 110 are the same. Accordingly, the voltages $V_{121b}$ and $V_{122b}$ of the base capacitors 121b and 122b exhibit the characteristics as shown in FIG. 11. One transistor 106 is rendered non-conductive by virtue of the base voltage corresponding to the voltage $V_{121b}'$ in FIG. 11 and similarly the transistor 110 is rendered non-conductive by virtue of the base voltage corresponding to the voltage $V_{122b}'$ in FIG. 11. Accordingly, the conduction periods of the respective transistors 106 and 110 become substantially the same even when the current amplification factors are different from each other and a diversified difference of a temperature increase of the respective transistors 106 and 110 is reduced.

Figure 12:
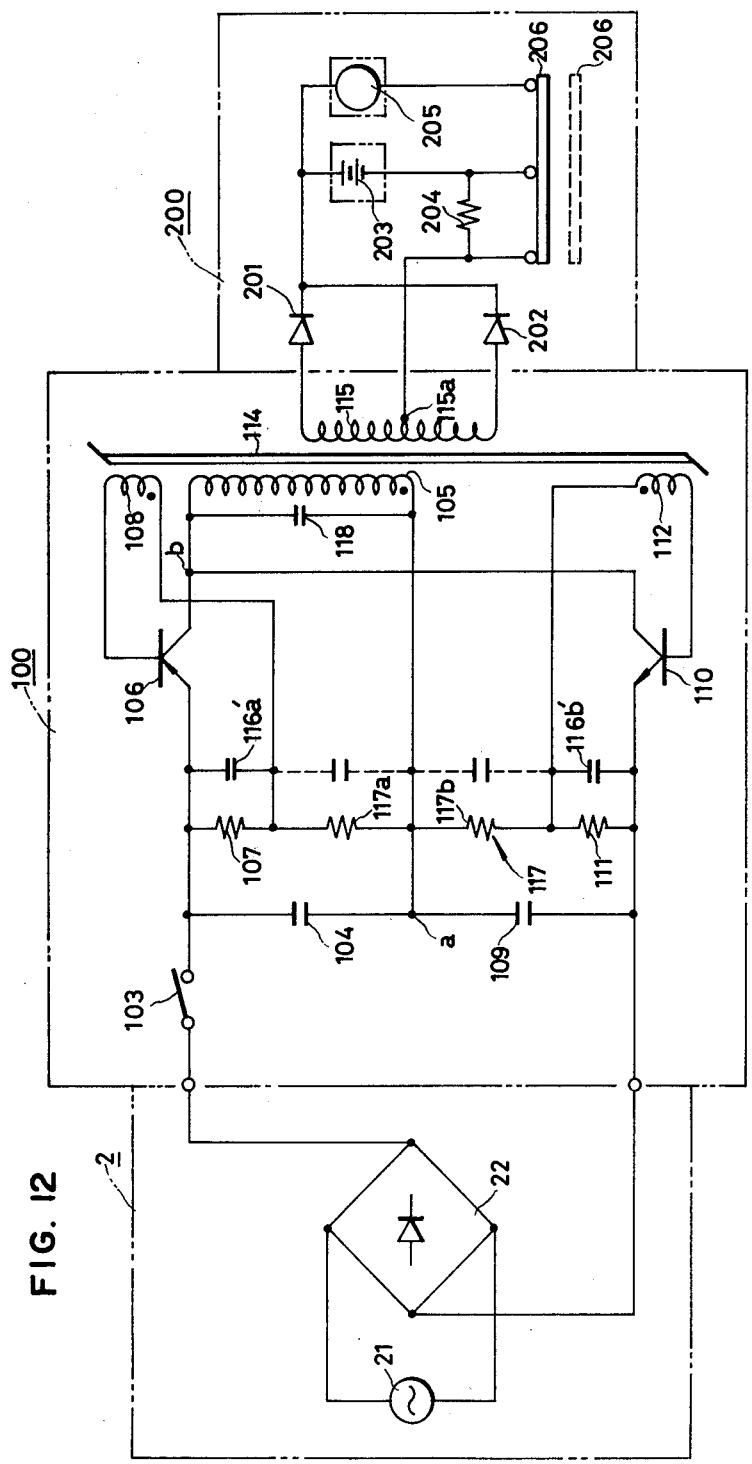
FIG. 12 is a schematic diagram of still another preferred embodiment of the present invention.

FIG. 12 is a schematic diagram of still another preferred embodiment of the present invention, wherein the capacitors 116a' and 116b' are connected in parallel with the respective base resistors 107 and 111, although in the above described embodiments these capacitors 116a and 116b were described as connected in parallel with the resistors 117a and 117b serving as an impedance means. The above described modification in FIG. 12 brings about the following advantages. In case where the capacitors 116a and 116b are connected in parallel with the resistors 117a and 117b as shown in FIG. 3, the capacitors 116a and 116b need be of an increased withstand voltage, inasmuch as the resistance values of the resistors 117a and 117b are larger than those of the base resistors 107 and 111, which makes the cost expensive and the capacitors large sized. By contrast, according to the FIG. 12 embodiment, since the capacitors 116a' and 116b' are coupled in parallel with the base resistors of a decreased resistance value, the capacitors 116a and 116b may be of a smaller withstand voltage and may be small sized, which enables provision of a power supply apparatus employing an inexpensive inverter.

Figure 13:
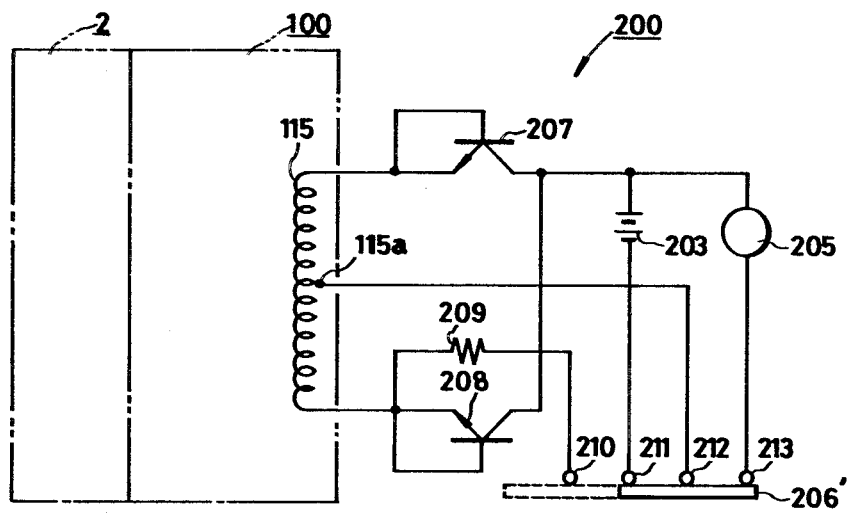
FIG. 13 is a schematic diagram of still a further preferred embodiment of the present invention.

FIG. 13 shows a preferred embodiment of the load circuit 200 coupled to the secondary winding 115 of the saturable transformer. The direct current voltage source 2 and the inverter 100 may be the same as those described in the foregoing embodiments. Therefore, in the following only the load circuit 200 is described in detail.

Both terminals of the secondary winding 115 of the saturable transformer are each coupled to one terminal of the battery 203 and the direct current motor 205 through the base/collector junctions of the planar transistors 207 and 208 the base and emitter electrodes of which are short circuited in the forward direction. The other ends of the battery 203 and the direct current motor 205 are connected to the first and second switch contacts 211 and 213. The central tap 115a of the secondary winding 115 is connected to the third contact 212 and one end of the secondary winding 115 is connected to the fourth switch contact 210 through a limiting resistor 209. A switch short circuiting piece 206' is switched to the solid line position as seen in FIG. 13 when the direct current motor 205 is to be utilized. When the switch 206' is turned on, the output of the inverter 100 is full wave rectified by the base/collector junctions of the transistors 207 and 208 through the central tap 115 and the direct current motor 205 is energized with a half of the full wave rectified output from the inverter 100, while the battery 203 is charged simultaneously. On the other hand, if and when the direct current motor 205 is not to be utilized, the switch short circuiting piece 206' is switched to the dotted line position as seen in FIG. 13 and the battery 203 is charged by the half wave rectified output of the output voltage from the secondary winding 115.

Figure 14:
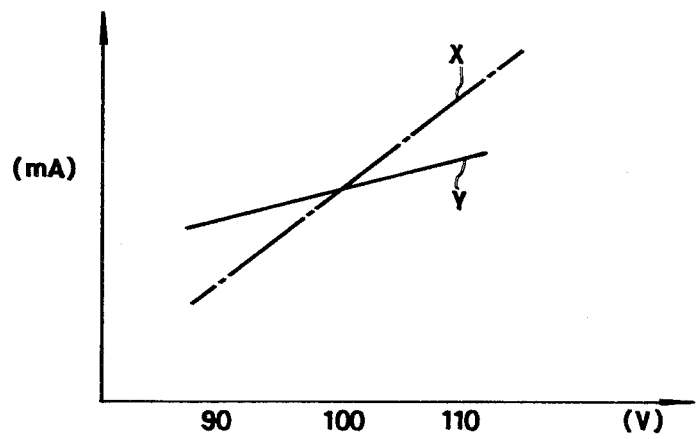
FIG. 14 shows a fluctuation characteristic of a charging current with respect to the source voltage fluctuation in the FIG. 13 embodiment.

In consideration of the fact that the number of turns of the secondary winding 115 of such saturable transformer or oscillation transformer is extremely small, say about 10 turns, in the embodiment shown in FIG. 3, for example, the circuit is configured such that the battery 203 is charged with a half of the output voltage of the inverter 100. Accordingly, the value of the limiting resistor 204 in FIG. 3 may be small. Therefore, the fluctuation of the battery charging current by virtue of fluctuation of the commercial voltage source is relatively large, as shown by the line X in FIG. 14. By contrast, according to the embodiment shown, since the battery 203 is adapted to be charged with the full output voltage from the inverter 100 appearing across the secondary winding 115, the value of the limiting resistor 209 can be selected to be larger, say several times larger, as compared with that of the limiting resistor 204 in the FIG. 3 embodiment. Therefore, the fluctuation of the battery charging current with respect to the fluctuation of the commercial power source voltage is reduced as shown by the line Y in FIG. 14.

Generally speaking, a diode is structured such that a pellet is directly connected between two terminals of external lead wires. Therefore, if once a diode is damaged, there is a fear that these two external lead wires are closed rather than opened. Accordingly, there is a fear that if and when the direct current motor 205 or the battery 203 is short circuited, a large short circuit current continues to flow through the secondary winding 115, resulting in a fire of the components in the inverter 100. By contrast, according to the embodiment shown, planar type transistors 207 and 208 are employed in place of the conventional diodes, wherein the base/collector junctions having a rectifying characteristic are utilized. Such a planar type transistor is structured such that a bonding wire or internal lead wire of a thickness of 30 microns is connected between the external lead wire and the pellet. Therefore, if and when a planar type transistor is employed in the embodiment, the capacity of the collector current is restricted by the said wire. Accordingly, even when the direct current motor 205 or the battery 203 is short circuited, the bonding wire is melted and is broken by an increased short circuiting current flowing through the secondary winding 115, whereby a fire accident of the respective components in the inverter 100 is prevented.

Incidentally described, although the base/emitter junction of a transistor can be considered similarly to an ordinary diode, a voltage $V_{EBO}$, i.e. a voltage between the base and emitter electrodes when the base electrode is opened, is lower and the transistor cannot be utilized as a diode when the induced voltage across the secondary winding 115 is large. In order to eliminate such an inconvenience, therefore, the embodiment shown employs the base/collector junctions of the transistors 207 and 208 for the purpose of rectification.

Figure 15:
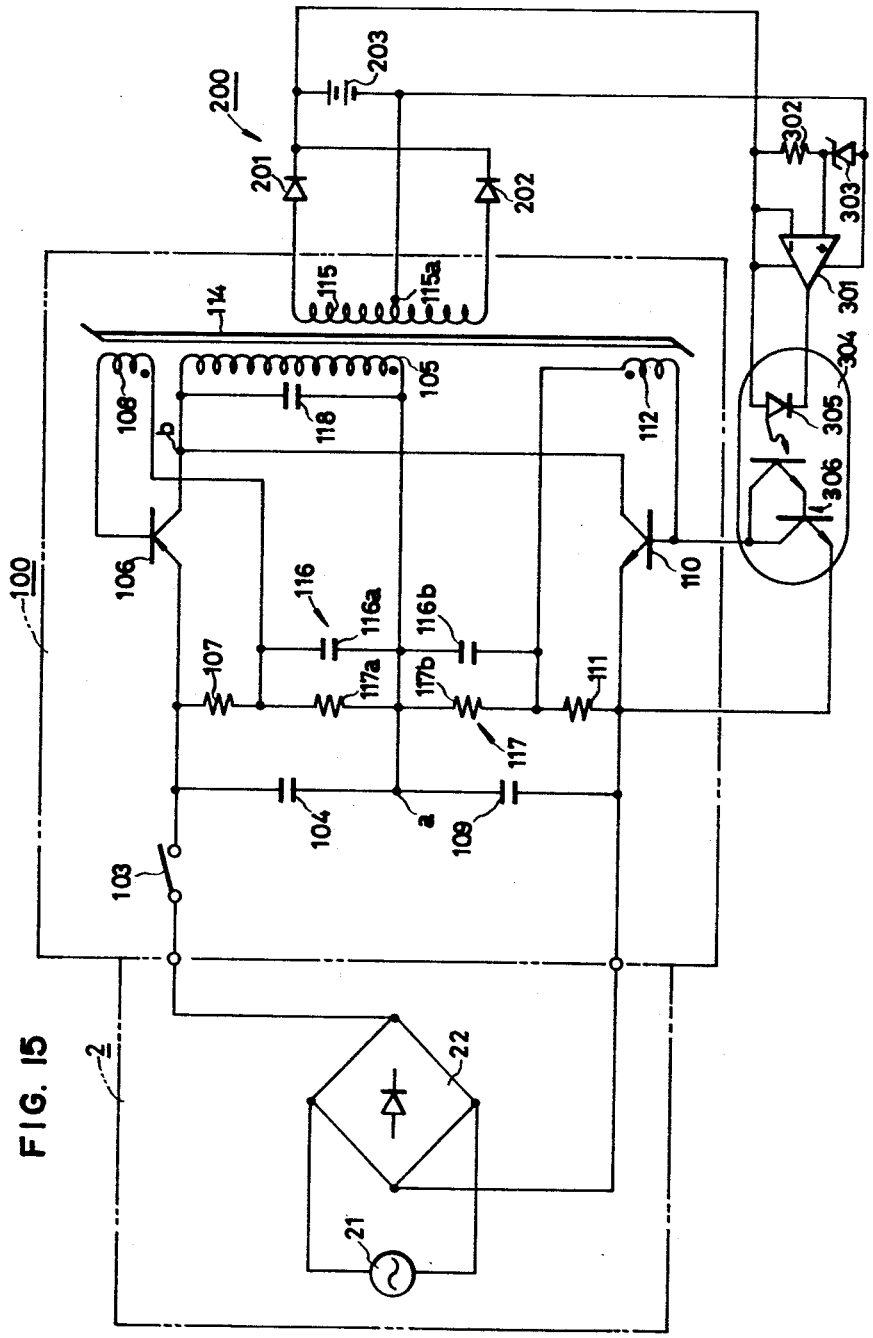
FIG. 15 is a schematic diagram of still a further preferred embodiment of the present invention.
Figure 16:
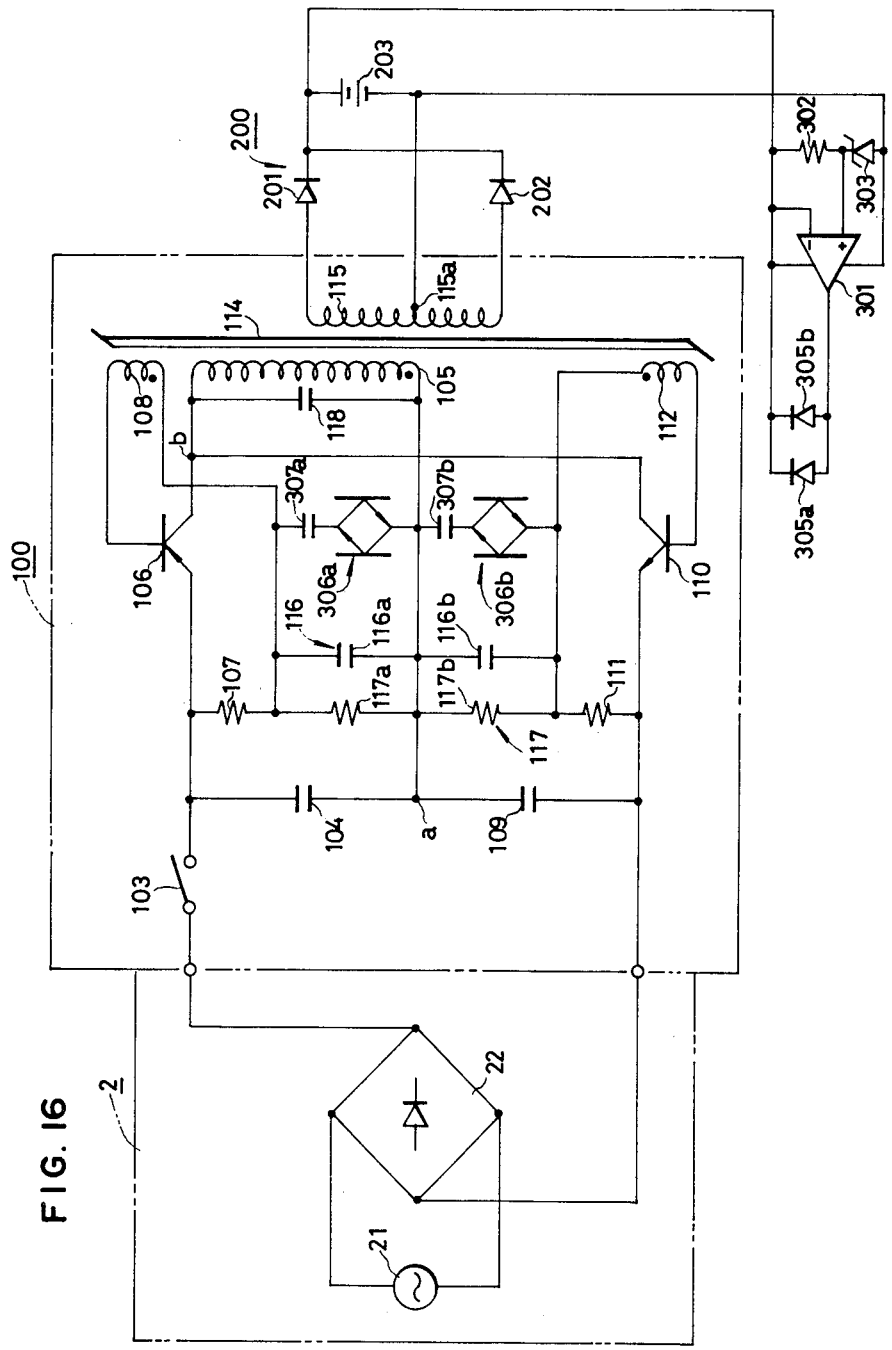
FIG. 16 is a schematic diagram of still a further preferred embodiment of the present invention.
Figure 17:
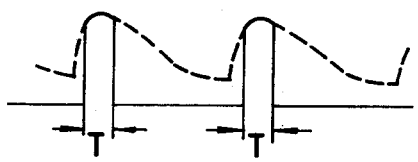
FIG. 17 is a wave form of a charging voltage of the secondary battery in the FIG. 16 embodiment.

In case where the battery 203 is connected as the load circuit 200, then it is necessary to prevent overcharging of the battery 203. FIGS. 15 through 17 shows two preferred embodiments for that purpose.

FIG. 15 is a schematic diagram of still a further preferred embodiment of the present invention, wherein the following modifications are employed as compared with a FIG. 3 embodiment. A switching device 306 is connected between the base and emitter electrodes of one transistor 110 of the inverter 100. The battery 203 is shunted by a series connection of a resistor 302 and a constant voltage device 303 and a detector 301 for detecting whether the battery charged amount reaches a predetermined value when the battery 203 is charged. The detector 301 is structured to detect a point where the voltage of the battery 203 associated with the battery charged amount reaches a reference voltage determined by a constant voltage element 303 and may comprise an operation amplifier, for example. The detector 301 is provided at the output thereof with an active element 305 for closing the above described switching device 306. In the embodiment shown, a photocoupler 304 is employed and the switching device 306 is implemented by a phototransistor while the active device 305 is implemented by a light emitting diode.

In operation, if and when the direct current voltage source 2 and the inverter 100 are in the operation state as described in the FIG. 3 embodiment, then the battery 203 is charged by the output from the inverter as full wave rectified by means of the diodes 201 and 202. If and when the battery 203 is charged and the charged voltage increases to reach the reference voltage of the constant voltage element 303, then the active device 305 is rendered operative responsive to the output from the detector 301, thereby to emit light. The switching device 306 by way of a phototransistor is responsive to the light to be conductive. Accordingly, the base and emitter electrodes of the transistor 110 are short circuited and the voltage induced across the feedback winding 112 is not applied between the base and emitter electrodes of the transistor 110 any more. Therefore, the transistor 110 is rendered non-conductive. Since the transistor 110 is rendered non-conductive, the charging circuit of the dividing capacitor 104 is interrupted and the dividing capacitor 104 is not charged any more and the transistor 106 comes to be non-conductive. Therefore, the oscillating operation of the inverter 100 is stopped and hence the charging operation of the battery 203 is stopped.

FIG. 16 shows a schematic diagram of a further preferred embodiment of the present invention most suited for preventing such overcharging. In comparison with the FIG. 15 embodiment, the FIG. 16 embodiment comprises the following modifications. More specifically, in the FIG. 15 embodiment, the switching device 306 was interposed between the base and emitter electrodes of the transistor 110, in order that one transistor 110 of the inverter 100 may be interrupted responsive to the charged amount of the battery 203. By contrast, according to the FIG. 16 embodiment, two active elements 305a and 305b of such as light emitting diodes are coupled to the output of the detector 301. In addition, the bidirectional switching devices 306a and 306b of such as phototransistors are provided so as to be on/off controlled responsive to the active devices 305a and 305b, such that each of the switching devices 306a and 306b constitutes a series connection together with each of capacitors 307a and 307b. The series connection of the capacitor 307a and the switching device 306a and the series connection of the capacitor 307b and the switching device 306b are each coupled between one end of the feedback windings 108 and 112 and the junction a.

In operation, if and when the switch 103 is turned on and the inverter 100 is brought to an operating state, the battery 203 is charged by the output from the inverter 100 as rectified by means of the diodes 201 and 202. When the battery 203 is charged and the battery voltage increases to reach the reference voltage of the constant voltage device 303, the active devices 305a and 305b implemented by light emitting diodes are responsive to the output of the detector 301 to emit light and the bidirectional switching devices 306a and 306b implemented by phototransistors responsive to the light from the active devices 305a and 305b to become conductive.

Accordingly, the capacitors 307a and 307b are coupled in parallel with the respective capacitors 116a and 116b, whereby the composite capacitances of the capacitors 116a and 307a and the capacitors 116b and 307b become larger. These capacitors 116a, 307a, 116b, and 307b are charged as a function of the counter electromotive force through the respective feedback windings 108 and 112 and the base/collector junctions of the transistors 106 and 110. More specifically described centering on the capacitors 116b and 307b, in case of transition from a state where the transistor 106 is turned on and the transistor 110 is turned off to a situation where the transistor 106 is turned off and the transistor 110 is turned on, the capacitors 116b and 307b are charged as a function of the counter electromotive force through the feedback winding 112 and the base/collector junction of the transistor 110. Since the composite capacitance of the capacitors 116b and 307b in such a situation is larger than the capacitance of only the capacitor 116b, the reverse bias period of the transistor 110 which is about to be turned on increases. As the peak value of the full wave rectified output from the output terminals of the direct current voltage source 2 increases, the base/emitter junction of the transistor 110 is forward biased. Therefore, the conduction period of the transistor 110 comes to be when the peak value of the full wave rectified output becomes high and the output from the diodes 201 and 202 is confined to the period T shown in FIG. 17, that means a supplemental charging state. According to the described embodiment, detection is made of whether the battery 203 being charged reaches a predetermined charged state and a reverse bias period of the transistor is provided by increasing the capacitor capacitance of the impedance circuit of the inverter 100, whereby the on period of the transistors 106 and 110 is shortened and the charging state is switched from the rapid charging to supplemental charging. Therefore, the usable range of the charging apparatus of the battery employing a half bridge type inverter can be expanded.

Meanwhile, it is pointed out that a combination of the active device 305(305a and 305b) and the switching device 306(306a and 306b) in the above described embodiment may be a different one, other than the above described photocoupler, and may comprise a combination of a relay coil and the contacts thereof, for example.

Generally, a power supply apparatus employing a pushpull type inverter provides an oscillation output from the inverter which is of a rectangular wave form and the output is larger, which is liable to cause a noise from the inverter. Assuming a case where audio equipement is placed near a small sized electrical machine including a charging circuit, a space capacitance is formed between the battery of a larger surface area in the load of the inverter and the audio equipement and the noise occurring from the inverter through such a space capacitance is liable to adversely affect the audio equipement. Such noise merely comprises a common mode noise which may be defined as a noise occurring between the ground and electrical equipement and is different from a normal mode noise which is occurring between two lines in the equipement. As different from a normal mode noise, such a common mode noise is difficult to be treated irrespective of an increased magnitude.

Figure 19:
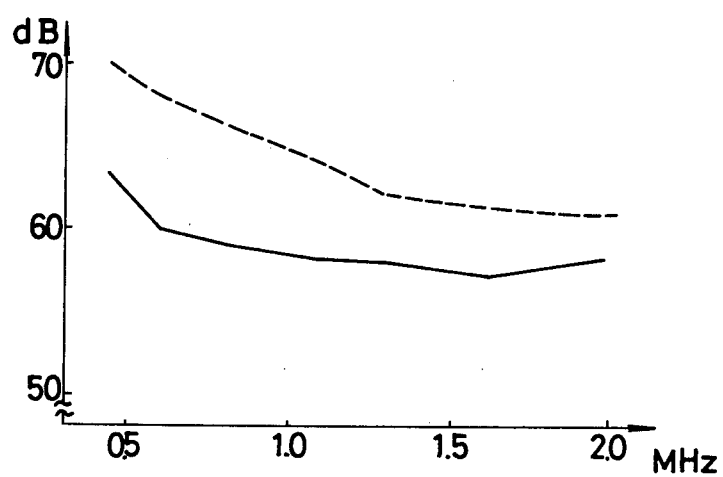
FIG. 19 shows a noise characteristic.
Figure 18:
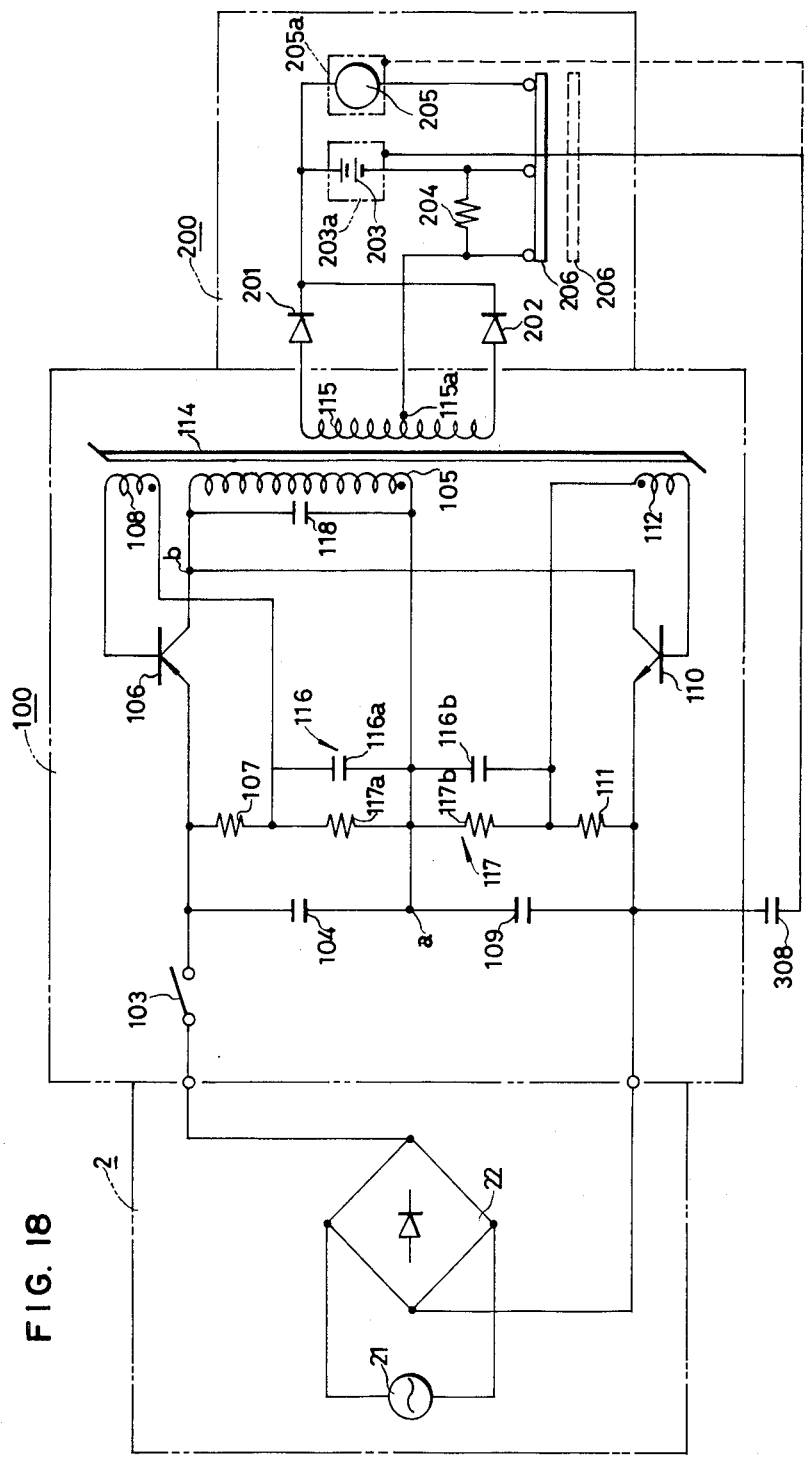
FIG. 18 is a schematic diagram of still another preferred embodiment of the present invention.

FIG. 18 shows still a further preferred embodiment of the present invention, which is comtemplated to reduce such a common mode noise. To that end, a noise absorbing capaciter 308 is provided. One end of the noise absorbing capacitor 308 is connected to the casing 203a of the battery 203 or the casing 205a of the direct current motor 205 and the other end of the noise absorbing capacitor 308 is connected to the rectification output terminal of the full wave rectifying circuit 22 or the output terminal of the direct current voltage source 2. The capacitor 308 serves to isolate in a direct current manner the primary side and the secondary side of the saturable transformer while coupling them in an alternate current manner. Accordingly, the noise appearing on the primary winding 105 is transferred through the secondary winding 115 to the casing 203a of the battery 203 or to the casing 205a of the direct current motor 205 but the noise of the casing 203a or the casing 205a is absorbed on the primary side of the transformer by means of the said capacitor 308. Incidentally described, the experimentation shows that without the capacitor 308 the characteristic as shown by the dotted line is obtained as shown in FIG. 19, while with the capacitor 308 the characteristic as shown by the solid line is obtained as shown in FIG. 19, the FIG. 19 graph showing a decrease of the noise by several decibels.

Although in the foregoing description of several embodiments, description was made mainly centering on the characteristic features of the respective embidiments. However, it is pointed out that a power supply apparatus more suited for a necessary requirement can be provided by a proper combination of the above descibed embodiments.

It is pointed out that the present invention is particularly suited for a power supply apparatus for a portable electric shaver. In general, an electric shaver comprises a casing having an opening, a shaver cutter assembly provided so as to be exposed through the opening, and a primer mover such as an electric motor for driving the shaver cutter assembly. Typically, the shaver cutter assembly comprises a stationary cutter mounted in the shaver casing so as to be exposed through the opening and a movable cutter provided to be movable with respect to the stationary cutter. The prime mover may comprise a direct current motor coupled to be energized by a direct current voltage output for driving the movable cutter. According to one prior art approach, the casing is formed of a space for housing a dry cell or a rechargeable battery for providing a direct current voltage output. Alternatively, a prior art electric shaver is structured to be adaptably connected to a separate AC adapter, which is structured to convert an alternate current voltage from a commercial power supply into a direct current voltage suited for driving a direct current motor. Since such a prior art AC adapter is bulky, it was impossible to built both a rechargeable battery and an AC adapter in a shaver casing, without increasing the bulkiness of a shaver casing. Thus, it is desired that a compact electric shaver is provided wherein both a rechargeable battery and an AC adaptor is built in a shaver casing. According to the present invention, however, such an AC adaptor is provided which is compact and light weight. More specifically, referring to FIG. 3, for example, the battery 203 can be used as a rechargeable battery for energizing a direct current motor for an electric shaver and the direct current motor 205 can be used as a direct current motor for driving the movable cutter of a shaver cutter assembly, by housing the circuit components shown as well as a rechargeable battery and the direct current motor in a shaver casing. According to the present invention, the inverter circuit 100 and the bridge circuit 22 as well as the rechargeabl battery 203 and the direct current motor 205 can be housed in a shaver casing of an ordinary size, without a substantial increase of the size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus comprising a direct current voltage source, and an inverter for converting a direct current output from said direct current voltage source into an alternate current voltage, said inverter comprising:
   a first series connection of a pair of first and second dividing capacitors, said first series connection being coupled in parallel with said direct current voltage source,
   a second series connection of a pair of first and second transistors, each including emitter, base and collector electrodes, said series connection being coupled in parallel with said direct current voltage source,
   a pair of first and second base resistors,
   a saturable transformer including a saturable magnetic core, a primary winding wound on said saturable magnetic core, and a pair of first and second feedback windings wound on said saturable magnetic core and magnetically coupled to said primary winding,
   said primary winding being connected between the junction of said pair of first and second dividing capacitors of said first series connection and the junction of said pair of first and second transistors of said second series connection,
   each of said pair of first and second feedback windings being coupled between said base and emitter electrodes of each of said pair of first and second transistors through each of said pair of first and second base resistors, respectively, and
   impedance means connected between the junction of said first feedback winding and said first base resistor of said first transistor and the junction between said second feedback winding and said second base resistor of said second transistor.

2. A power supply apparatus in accordance with claim 1, wherein said impedance means comprises a reactance component.

3. A power supply apparatus in accordance with claim 2, wherein said reactance component comprises a capacitive reactance component.

4. A power supply apparatus in accordance with claim 3, wherein said impedance means comprises a parallel connection of a resistor and a capacitor.

5. A power supply apparatus in accordance with claim 1, wherein said impedance means comprises a series connection of a pair of third and fourth capacitors, and
   the junction of said pair of third and fourth capacitors is connected to the junction of said pair of first and second dividing capacitors.

6. A power supply apparatus in accordance with claim 1, wherein said pair of first and second transistors comprises a pair of complementary transistors, and the emitter electrodes of the respective transistors are connected to said direct current voltage source.

7. A power supply apparatus in accordance with claim 1, which further comprises a pair of first and second diodes, each being connected in the reverse direction between collector and emitter electrodes of each of said pair of first and second transistors, respectively.

8. A power supply apparatus in accordance with claim 1, wherein each of said pair of first and second transistors is selected such that the saturation voltage developed between the emitter and collector electrodes when each said transistor is operating as a backward transistor is relatively small.

9. A power supply apparatus in accordance with claim 1, which further comprises a pair of first and second time constant circuits, each comprising a series connection of a resistor and a capacitor and being coupled between each of said emitter electrodes of said pair of first and second transistors, respectively, and said impedance means.

10. A power supply apparatus in accordance with claim 5, wherein said pair of third and fourth capacitors constituting said impedance means are each coupled in parallel with the base resistors of said first and second transistors, respectively.

11. A power supply apparatus in accordance with claim 1, wherein said saturable transformer comprises a secondary winding wound on said saturable magnetic core, and which further comprises means for rectifying the output voltage induced across said secondary winding for providing a direct current output.

12. A power supply apparatus in accordance with claim 11, wherein said rectifying means comprises a diode.

13. A power supply apparatus in accordance with claim 11, wherein said rectifying means comprises a collector/base junction of a planar transistor.

14. A power supply apparatus in accordance with claim 11, which further comprises a direct current motor connected to be energized with the output from said rectifying means.

15. A power supply apparatus in accordance with claim 11, which further comprises a storage battery connected to be charged with the output from said rectifying means.

16. A power supply apparatus in accordance with claim 15, which further comprises a direct current motor connected to be energized with the output from said rectifying means.

17. A power supply apparatus in accordance with claim 15, which further comprises
   means for detecting the charged state of said storage battery, and
   switching means responsive to the output from said detecting means for short circuiting the base/emitter electrodes of one of said pair of first and second transistors.

18. A power supply apparatus in accordance with claim 15, which further comprises
   means for detecting the charged state of said storage battery, and
   means responsive to the output from said detecting means for increasing the capacitance of said capacitor constituting said impedance means.

19. An electric shaver, comprising:
   a shaver casing having an opening, a shaver cutter assembly provided in said shaver casing so as to be exposed through said opening, said shaver cutter assembly comprising a stationary cutter and a movable cutter provided movably with respect to said stationary cutter, a power supply apparatus provided in said shaver casing and comprising a direct current voltage source, and an inverter for converting a direct current output from said direct current voltage source into an alternate current voltage, said inverter comprising:

a first series connection of a pair of first and second dividing capacitors, said first series connection being coupled in parallel with said direct current voltage source, a second series connection of a pair of first and second transistors, each including emitter, base and collector electrodes, said series connection being coupled in parallel with said direct current voltage source, a pair of first and second base resistors, a saturable transformer including a saturable magnetic core, a primary winding wound on said saturable magnetic core, a pair of first and second feedback windings wound on said saturable magnetic core and magnetically coupled to said primary winding, and a secondary winding wound on said saturable magnetic core and magnetically coupled to said primary winding, said primary winding being connected between the junction of said pair of first and second dividing capacitors of said first series connection and the junction of said pair of first and second transistors of said second series connection, each of said pair of first and second feedback windings being coupled between said base and emitter electrodes of each of said pair of first and second transistors through each of said pair of first and second base resistors, respectively, and impedance means connected between the junction of said first feedback winding and said first base resistor of said first transistor and the junction between said second feedback winding and said second base resistor of said second transistor, said electric shaver further comprising a rectifying circuit coupled to said secondary winding of said saturable transformer for rectifying the output from said secondary winding, and a direct current motor provided in said shaver casing and coupled to said rectifying circuit for driving said movable cutter of said shaver cutter assembly.

* * * * *

UNITED STATES PATENT AND TRADEMARK OFFICE
CERTIFICATE OF CORRECTION

PATENT NO. : 4,194,238
DATED : March 18, 1980
INVENTOR(S) : Takaaki Masaki

It is certified that error appears in the above-identified patent and that said Letters Patent are hereby corrected as shown below:

First page of patent, line 4 should read as follows:

[75] Inventor: Takaaki Masaki

Signed and Sealed this

Twenty-fifth Day of November 1980

[SEAL]

*Attest:*

SIDNEY A. DIAMOND

*Attesting Officer*  *Commissioner of Patents and Trademarks*